United States Patent [19]

Pavlath

[11] Patent Number: 4,906,096
[45] Date of Patent: Mar. 6, 1990

[54] APPARATUS AND METHOD FOR PHASE MODULATING OPTICAL SIGNALS IN A FIBER OPTIC ROTATION SENSOR

[75] Inventor: George A. Pavlath, Thousand Oaks, Calif.

[73] Assignee: Litton Systems, Inc., Beverly Hills, Calif.

[21] Appl. No.: 168,140

[22] Filed: Mar. 14, 1988

[51] Int. Cl.$^4$ ............................................... G01B 9/02
[52] U.S. Cl. ................................................. 356/350
[58] Field of Search ......................................... 356/350

[56] References Cited

U.S. PATENT DOCUMENTS 4,728,192  3/1988  Shaw et al. .................... 356/350

FOREIGN PATENT DOCUMENTS 2134248A  1/1983  United Kingdom .

Primary Examiner—Davis L. Willis
Assistant Examiner—S. A. Turner
Attorney, Agent, or Firm—Lynn & Lynn

[57] ABSTRACT

The operating point of a fiber optic rotation sensor is to obtain an increased sensitivity in the measurement of the Sagnac phase shift between counterpropagating beams in a sensing loop. The two counterpropagating optical waves are mixed for detecting interference of the waves to indicate the phase difference between them. The phase of the waves is modulated in accordance with a periodic function having a frequency equal to $f_s = (2n+1)/2\tau$ where $\tau$ is the transit time for an optical wave in the sensing loop. The interference pattern of the two waves is periodically sampled at a frequency equal to the modulation frequency.

4 Claims, 3 Drawing Sheets

APPARATUS AND METHOD FOR PHASE MODULATING OPTICAL SIGNALS IN A FIBER OPTIC ROTATION SENSOR

BACKGROUND OF THE INVENTION

This invention relates generally to rotation sensors and particularly to fiber optic rotation sensors. Still more particularly, this invention relates to apparatus and methods for modulating light signals in a fiber optic rotation sensor to maximize operational efficiency and minimize errors.

A fiber optic ring interferometer typically comprises a loop of fiber optic material having counter-propagating light waves therein. According to the Sagnac effect, the wave traveling in the direction of rotation of the loop has a longer transit time through the loop than the wave traveling opposite to the direction of rotation. This difference in transit time is seen as a shift in the relative phases of the waves. The amount of phase shift depends on the rotation rate. After traversing the loop, the counter-propagating waves are combined so that they interfere to form an optical output signal. The intensity of the optical output signal varies as a function of the type and amount of interference, which is dependent upon the relative phase of the counterpropagating waves. The optical output signal produced by the interference of the counter-approaching waves varies in intensity as a function of the rotation rate of the loop. Rotation sensing is accomplished by detecting the optical output signal and processing it to determine the rotation rate as a function of the phase shift.

A fundamental property of fiber optical ring rotation sensors is reciprocity. Ordinarily, any disturbance of the optical path affects both waves in the same way, even if the two waves are not subjected to the disturbance at exactly the same time or in the same direction. There are however, some disturbances which vary in time with a period comparable to the propagation time of the waves through the sensing loop. There are also nonreciprocal disturbances which do not have the same effect on the waves. The nonreciprocal disturbances are the Faraday Effect and the Sagnac Effect. These two types of disturbances which do not obey the reciprocity principle.

If no nonreciprocal disturbances appear in the counterpropagating waves, the phase difference between the two waves when they are recombined in the separating and mixing coupler is zero. The detection and processing apparatus respond to signals indicative of the optical power of the composite wave obtained after the counterpropagating waves have been mixed together. This power may be broken down into a constant component and a component proportional to the cosine of the phase shift. The component proportional to the cosine of the phase shift appears in the signal only when there are nonreciprocal disturbances in the optical path of the waves.

In the measurement of low amplitude disturbances, which correspond to low rotation rates, the component containing the cosine of the phase shift term is very small since the phase shift, $\Delta\phi$, is nearly zero. It is then necessary to add a fixed additional phase shift or nonreciprocal bias to the waves to increase the sensitivity of the measurement of the phase shift. One situation of interest is where the new phase shift measured is $\Delta\phi' = \Delta\phi + \pi/2$. In this case, the sensitivity is maximized since the term to be measured is proportional to cosine $(\Delta\phi + \pi/2)$, which is proportional to sine $\Delta\phi$. For small $\Delta\phi$, the sine term has maximum slope, so that small changes in $\Delta\phi$ are measurable.

There have however been difficulties in implementing a device that introduces a sufficiently stable nonreciprocal bias to be usable in a navigation grade rotation sensor.

Arditty et al. in Canadian Pat. No. 1,154,955 disclosed a process for shifting the operating point of a ring interferometer without requiring either a nonreciprocal bias or a great stability of the phenomena used to shift the operating point. That patent discloses a process for modulating the phase of waves in a ring interferometer that comprises the steps of forming a ring wave guide in which two electromagnetic waves travel in opposite directions, providing a source of electromagnetic energy, separating and mixing the electromagnetic waves in the ring and detecting the interference of the waves in the ring to determine the phase difference between them. Arditty et al. further disclose periodic and symmetric modulation of the phase of the waves with a period function $\phi(t) = \Delta\phi(t+2\tau)$ where $\tau$ is the time for each of the waves to travel over the path defined by the ring. Arditty further discloses detecting the phase difference at the frequency $1/2\tau$ and discloses a phase modulation device for implementing the process.

SUMMARY OF THE INVENTION

The apparatus according to the invention is a closed loop feedback system for processing signals output from a fiber optic rotation sensor that guides a pair of counterpropagating light waves in a sensing loop of optical fiber and combines the waves to produce an interference pattern indicative of the phase difference between the waves. The present invention provides apparatus and method for shifting the operating point of a fiber optic rotation sensor to obtain an increased sensitivity in the measurement of the Sagnac phase shift between the counterpropagating beams.

This invention provides modulation of phase of waves in a fiber optic gyroscope comprising means forming a sensing loop that guides two counterpropagating optical waves, a source of electromagnetic energy, means for separating and mixing the electromagnetic waves for detecting interference of the waves to indicate the phase difference between them. The present invention provides periodic modulation of the phase of the waves in accordance with a periodic function having a frequency equal to $f_s = (2n+1)/2\tau$ where $\tau$ is the transit time for an optical wave in the sensing loop. The interference pattern of the two waves is periodically sampled at a frequency equal to the modulation frequency. The fundamental principle of this invention is that modulating the phase of the waves in the fiber optic rotation sensor at a frequency $f = (2n+1)/2\tau$ where n is an integer and $\tau$ is the transit time of the light wave in the sensing loop provides significant operational advantages. Modulating the light at these frequencies provides most efficient operation of the phase modulator by requiring the lowest voltage, current, power and electric or magnetic field. These frequencies also provide suppression of Rayleigh backscattering induced noise by modulating this noise outside the detection bandwidth. These frequencies also provide elimination of parasitic polarization modulation caused by the phase modulator and certain nonlinearities in the phase modulation.

The apparatus comprises means for modulating the phase of light waves in the sensing loop with a periodic function having a frequency equal to $(2n+1)/2\tau$ where n is an integer and $\tau$ is the transit time of a light wave in the sensing loop; and detector means for detecting signals output from the sensing loop at a frequency producing a detector signal indicative of the phase difference of the waves. The apparatus may further includes means responsive to the detector signal for controlling the modulating means to pull the detector signal the control signal being indicative of the rotation rate of the sensing loop.

The apparatus according to the invention may further include gating means connected to the means for producing an electrical signal indicative of the phase difference of the waves; rate demodulating means connected to the output of the gating means for determining the rate and direction of rotation; and additional demodulating means connected to the output of the gating means to adjust the calibration of rate demodulating means.

The method of the invention for processing signals output from a fiber optic rotation sensor that guides a pair of counterpropagating light waves in a sensing loop of optical fiber and combines the waves to produce an interference pattern indicative of the phase difference between the waves, comprises the steps of modulating the phase of light waves in the sensing loop with a periodic function having a frequency equal to $(2n+1)/2\tau$; and detecting signals output from the sensing loop at a frequency producing a detector signal indicative of the phase difference of the waves. The method of the invention may further include the step of controlling the modulating means to null the detector signal, the control signal being indicative of the rotation rate of the sensing loop.

The method according to the invention may further include the steps of gating the electrical signal indicative of the phase difference of the waves; demodulating the gated electrical signal to determine the rotation rate and direction; and demodulating the gated electrical signal to adjust the calibration of the rotation rate signal.

DESCRIPTION OF THE PREFERRED EMBODIMENT

Figure 1:
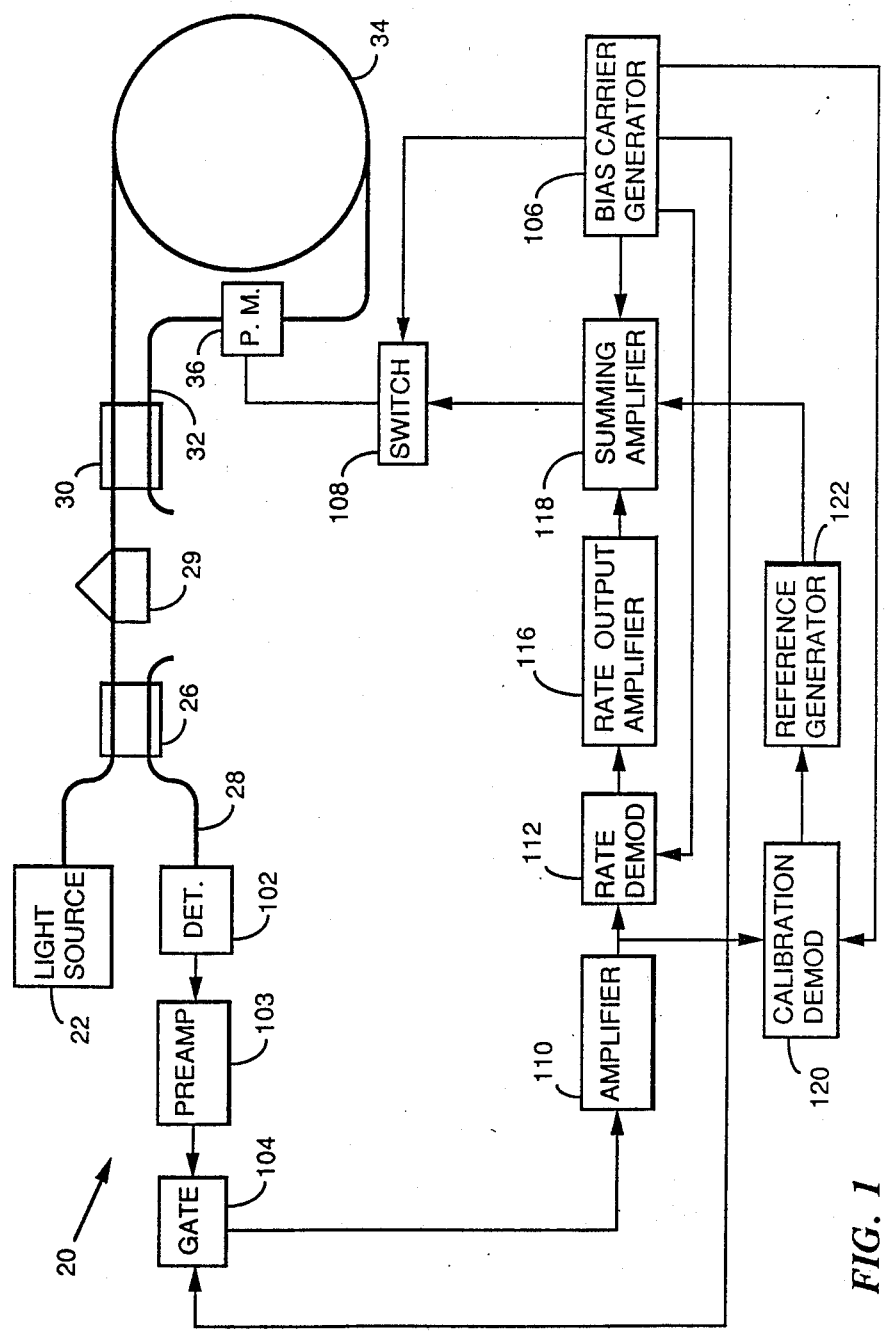
FIG. 1 illustrates a fiber optic rotation sensor and circuitry for processing the optical signal output form the Sagnac ring to null the Sagnac phase shift.

Referring to FIG. 1, a fiber optic rotation sensor 20 includes a light source 22 that supplies coherent light to an optical fiber 24. The optical fiber 24 guides the source beam to a fiber optic directional coupler 26, which couples light between the optical fiber 24 and an optical fiber 28. Light that propagates through the fiber optic directional coupler 26 and remains in the optical fiber 24 is guided to a polarizer 29 and then to a second fiber optic directional coupler 30. The fiber optic directional coupler 30 couples light between the optical fiber 24 and a third length of an optical fiber 32.

Light that propagates through the fiber optic directional coupler 30 and remains in the fiber 24 then propagates to a sensing coil 34. Light that enters the sensing coil 34 from the optical fiber 30 forms a clockwise wave in the coil. The sensing coil 34 may be formed from a separate optical fiber, or it may be formed in a portion of the optical fiber 24. After passing through the sensing coil 34, the clockwise wave enters a phase modulator 36.

Light that the fiber optic directional coupler 30 couples from the optical fiber 24 into the optical fiber 32 forms a counterclockwise wave. The optical fiber 32 may be either a separate fiber or a portion of the optical fiber that forms the sensing coil 34. The counterclockwise wave first passes through the phase modulator 36 before entering the sensing coil 34.

The clockwise wave and the counterclockwise wave have the same phase before they pass through the sensing coil 34. If the sensing coil 34 is rotating about a line through the plane of the coil, then the waves experience a phase shift relative to each other. The clockwise wave enters the fiber optic directional coupler 30 after passing through the phase modulator 36, and the counterclockwise wave enters the fiber optic directional coupler 30 after passing through the sensing coil 34. Part of the counterclockwise wave propagates through the fiber optic directional coupler 30, and the remainder of the counterclockwise wave couples into the end 38 of the optical fiber 32. A portion of the clockwise wave remains in the fiber 32, and the remainder of the clockwise wave is coupled into the fiber optic directional coupler 26 by the fiber optic directional coupler 30.

A fiber optic directional coupler suitable for use in single mode applications as the couplers 26 and 30 of FIG. 1 is described in the Mar. 29, 1580 issue of Electronics Letters, Vol. 28, No. 28. pp. 260–261 and in U.S. Pat. No. 4,493,528 issued Jan. 15, 1985 to Shaw et al. That patent is assigned to the Board of Trustees of the Leland Stanford Junior University. The disclosure of that patent is hereby incorporated by reference into the present disclosure.

A suitable structure for the polarizer 29 is described in U.S. patent application Ser. No. 557,884, which was filed Dec. 3, 1983 by the present inventor and assigned to Litton Systems, Inc., owner of the present invention. The disclosure of that patent application is hereby incorporated by reference into the present disclosure. Other devices for polarizing a signal propagating in an optical fiber may also be used in the present invention.

Figure 2:
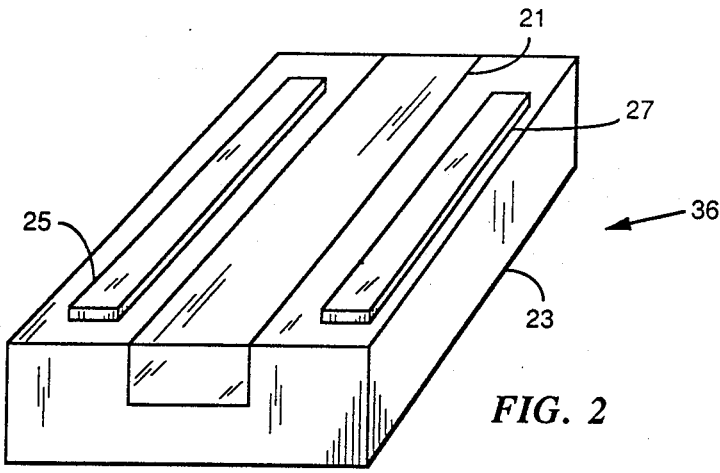
FIG. 2 is a perspective view of an integrated optics phase modulator that by may be included in the fiber optic gyroscope of FIG. 1.
Figure 3:
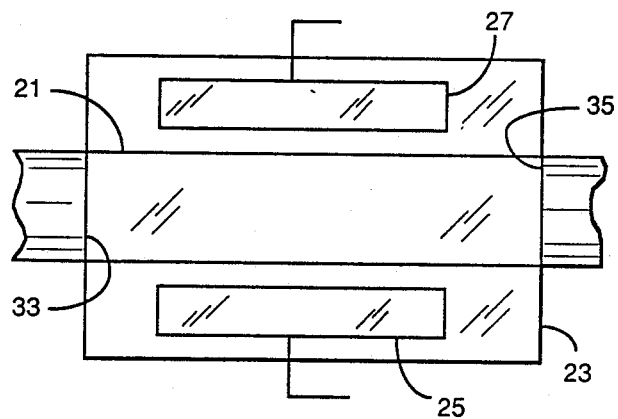
FIG. 3 is a plan view of the phase modulator of FIG. 2.
Figure 4:
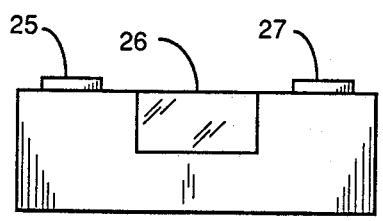
FIG. 4 is an end elevation view of the phase modulator of FIGS. 4 and 5.

Referring to FIGS. 2–4, the phase modulator 36 may comprise an optical waveguide 40 formed on a substrate 42 of an electrooptically active material such as lithium niobate. The structure shown in FIGS. 2–4 is only an example of a suitable electrode arrangement for providing the desired phase modulation. Other phase modulation devices and other electrode configurations may be used to practice the invention; therefore the scope of the invention is not restricted to the particular A pair of electrodes 44 and 46 are attached to the substrate on opposite sides of the waveguide 40. The electrodes 44 and 46 may be formed on the substrate 42 by vacuum deposition of aluminum. The optical waveguide 40 may be formed in the substrate 41 by first depositing a strip of titanium on the substrate 42 and heating it to diffuse the titanium into the substrate 42. The resulting waveguide 40 has a generally rectangular cross section as shown in FIGS. 2 and 4. The fiber 32 must be cut to have two ends 33 and 35 that are butt coupled to opposite sides of the optical waveguide 40 as shown in FIGS. 1 and 11.

Application of a voltage across the electrodes changes the refractive index of the optical waveguide 40 by means of the electrooptic effect. The transit time of a light wave through the waveguide 40 is the product of the length of the waveguide and its refractive index divided by the speed of light in vacuum. Changing the refractive index of the optical waveguide 40 thus changes the transit time of an optical signal through it. Because of the sinusoidal nature of the electromagnetic fields that comprise the light wave, the change in transit time is seen as a change in phase of the wave.

Other structures that provide phase modulation of an optical wave propagating in a fiber may be used in the present invention instead of the phase modulator described above. A phase modulator structure suitable for use in the invention includes a length of optical fiber wrapped around a mandrel formed of a piezoelectric material (not shown). Application of voltage to the piezoelectric material causes it to expand or contract, thereby changing the length of the fiber. The length change causes a change in transit time of a light wave in the fiber. This change in transit time is seen as a modulation of the phase of the waves.

The signal processing circuitry shown in FIG. 1 shows one way to apply the principle of the invention. The illustrated circuitry is by way of example only and is not intended to limit the scope of the invention to require the use of any particular circuitry. The circuitry of FIG. 1 may be formed of either analog or digital components.

The circuitry of FIG. 1 applies a phase shift signal to the phase modulator 36 to shift the phase of the waves with a signal $f=(2n+1)/2\tau$ where $\tau$ is the transit time of the light waves in the sensing loop 34, and n is an integer.

The output of the detector 102 is input to a preamplifier 103, which amplifies the signal and conditions it for input to a gate 104. The detector 102 may be a commercially available device such as Motorola MFOD 2404, which includes a photodiode and a hybrid amplifier with wide bandwidth characteristics. The gate 104 may be a CMOS analog switch such as the Siliconix DG271. A bias carrier generator 106 controls both the gate 104 and a switch 108, which is connected to the phase modulator 36. When the gate 104 is conductive, the output of the preamplifier 102 is input to an amplifier 110. The amplified signal is output from the amplifier 110 and then input to a rate demodulator 112 and to an amplitude demodulator 120. The rate amplifier produces a signal that is directly proportional to the output rate of the sensor loop 34. This rate signal is is then summed with the bias carrier signal and switched on and off as shown in FIG. 2. The resulting signal is then used to close the rate servo loop. The bias carrier generator 106 also provides an actuating signal to the rate demodulator 112.

The output of the amplifier 110 is also input to a calibration demodulator 120, which receives a signal from the bias carrier generator 106. The signal output from the calibration demodulator 120 is input to a reference generator 122, which provides an output to control the gain of the summing amplifier 118.

The phase modulator signal preferably will cause a component of the total phase shift equal and opposite to the rotation-induced phase shift. An opposite polarity bias signal is applied to the phase modulator 36 to null the rotation rate of the sensing loop 34 as seen by the photodetector 102. The amplitude of the signal applied to the phase modulator 34 to null the rotation rate of the sensing loop 34 is directly proportional to the output rate of the gyro.

Figure 5:
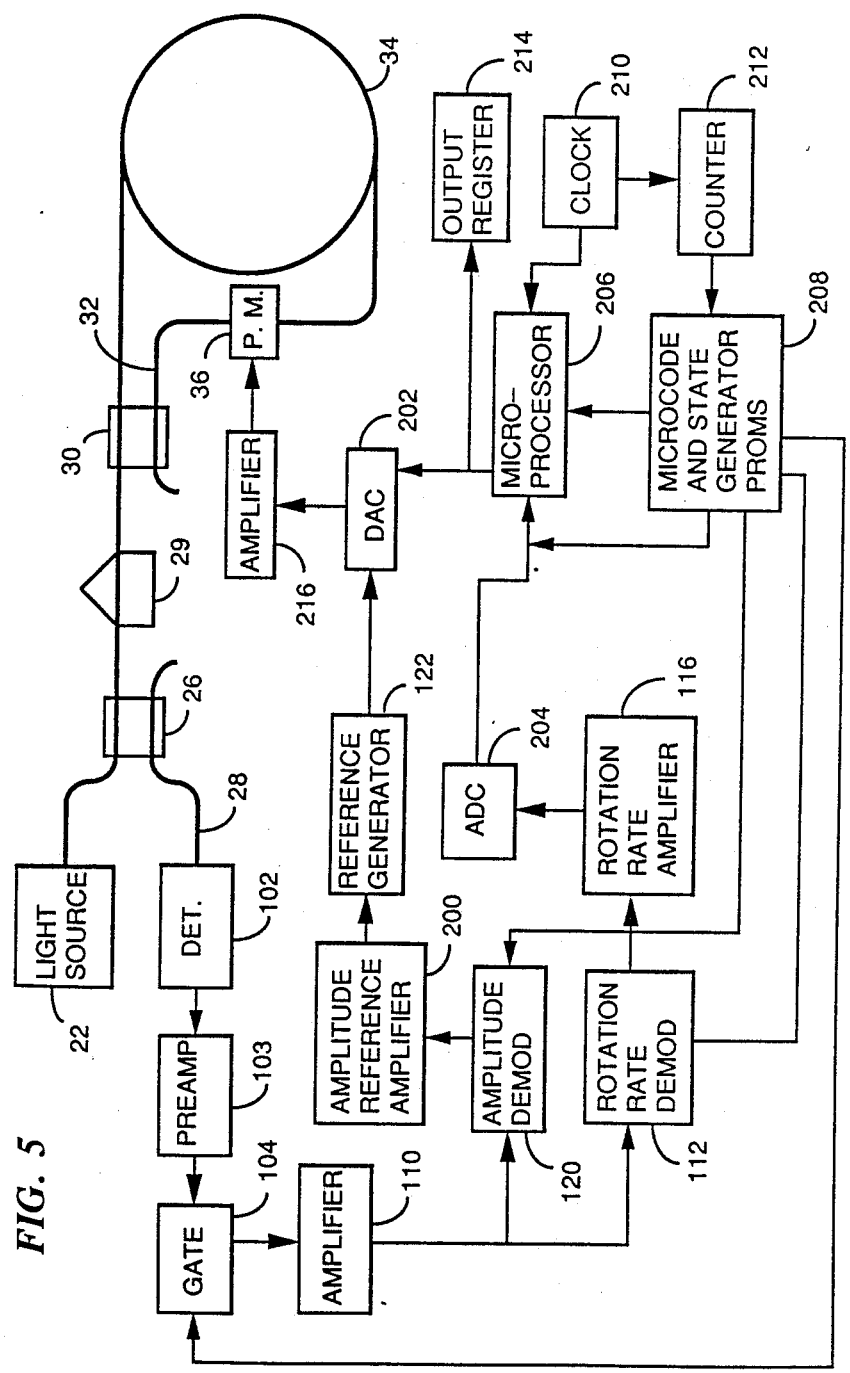
FIG. 5 illustrates another apparatus for practicing the present invention.

FIG. 5 shows a second circuit for practicing the invention. The basic structure of the fiber optic rotation sensor included in FIG. 5 is identical to that of FIG. 1. Components in FIG. 5 that are the same as the corresponding components in FIG. 1 have the same reference characters in both drawings. These components are the source 22, couplers 26 and 30, fibers 24, 28 and 32, phase modulator 36, sensing coil 34, detector 102, preamplifier 103, gate 104, amplifier 110, calibration demodulator 120, rotation rate demodulator 112, rotation rate amplifier 116 and reference generator 122. Items shown in FIG. 5 that are not in FIG. 1 have reference characters beginning with the numeral "2".

The signal output from the amplifier 110 is input to the amplitude demodulator 120 and to the rotation rate demodulator 112. Both the calibration demodulator 120 and the rotation rate demodulator 112 may be commercially available demodulator circuits such as the Siliconix DG271. The rotation rate demodulator 112 recovers rate error signals from the sensing loop. These rotation rate error signals are amplified by the rotation rate amplifier 116, which may be a signal amplifying device such as a Burr Brown 3550 operational amplifier. After amplification, the rate error signals are converted to digital signals by an analog to digital converter 204 that is connected to the output of the the rotation rate amplifier 116. The analog to digital converter 204 may be any suitable device, such as a Burr Brown PCM 75 16 bit analog to digital converter for converting analog electrical signals to digital.

The digital rotation rate error signals from the analog to digital converter 204 are input to a microprocessor 206, which may be a Logic Devices Inc. 429C01 bit slice microprocessor. The microprocessor 206 is used to accumulate the error signal, scale it and sum it with the bias carrier signal from a microcode and state generator PROM device 208. The microprocessor 206 is operated as a state device. It generates the appropriate bias carrier signal. The microprocessor 206 is operated conventionally and is clocked and controlled in its states by a set of PROMs 208 generate the gate and demodulation signals. A clock 210 supplies clock signals to the microprocessor 206. The clock 210 also provides clock signals to a counter 212 that supplies signals to the PROMs 208.

The digital output of the microprocessor 206 drives both the feedback digital to analog converter 202 and the digital rotation rate output interface, which may be a 16 bit output register 214.

The calibration demodulator 120 provides an output signal to an amplitude reference amplifier 200, which drives the reference generator 122. The output of the reference generator 122 is input to the digital to analog converter 202. The digital to analog converter 202 provides signals to a video amplifier 216, which drives the amplifier 110 and uses this signal to control the gain of the digital to analog converter 202 to scale its full scale output to be $2\pi$.

The digital to analog converter 202 may be be a Burr Brown 710, which is a 16 bit device. The gain of the digital to analog converter 202 is controlled by using the reference amplifier 200 and the reference generator 122 to scale the output of the digital to analog converter 202 and the video amplifier. The output video amplifier 216 may be any suitable amplifier, such as a Comlinear CLC 210 high speed operational amplifier or as was for amplifying electrical signals in the frequency range commonly used for video signals.

I claim:

1. Apparatus for processing signals output from a fiber optic rotation sensor that guides a pair of counter-propagating light waves in a sensing loop of optical fiber and combines the waves to produce an interference pattern indicative of the phase difference between the waves, comprising:

means for modulating the phase of light waves in the sensing loop with a periodic function having a frequency equal to $(2n+1)/2\tau$ where n is an integer greater than zero and t is the transit time of a light wave in the sensing loop; and detector means for detecting signals output from the sensing loop at a frequency producing a detector signal indicative of the phase difference of the waves.

2. Apparatus according to claim 1 further including means responsive to the detector signal for controlling the modulating means to null the detector signal, the control signal being indicative of the rotation rate of the sensing loop.

3. A method for processing signals output from a fiber optic rotation sensor that guides a pair of counter-propagating light waves in a sensing loop of optical fiber and combines the waves to produce an interference pattern indicative of the phase difference between the waves, comprising the steps of:

modulating the phase of light waves in the sensing loop with a periodic function having a frequency equal to $(2n+1)/2\tau$ where n is an integer greater than zero and t is the transit time of a light wave in the sensing loop; and detecting signals output from the sensing loop at a frequency producing a detector signal indicative of the phase difference of the waves.

4. The method of claim 3 further including the step of controlling the modulating means to null the detector signal, the control signal being indicative of the rotation rate of the sensing loop.

* * * * *